US009285979B2

(12) United States Patent
Tjissen

(10) Patent No.: US 9,285,979 B2
(45) Date of Patent: Mar. 15, 2016

(54) COMPUTER-IMPLEMENTED METHODS AND SYSTEMS FOR MULTI-TOUCH DUPLICATION AND SWAPPING INTERACTIONS

(71) Applicant: Adobe Systems Incorporated, San Jose, CA (US)

(72) Inventor: Remon Tjissen, Mill Valley (NL)

(73) Assignee: Adobe Systems Incorporated, San Jose, CA (US)

( * ) Notice: Subject to any disclaimer, the term of this patent is extended or adjusted under 35 U.S.C. 154(b) by 396 days.

(21) Appl. No.: 13/621,641

(22) Filed: Sep. 17, 2012

(65) Prior Publication Data

US 2014/0082539 A1 Mar. 20, 2014

(51) Int. Cl.
*G06F 3/0488* (2013.01)
*G06F 3/0481* (2013.01)

(52) U.S. Cl.
CPC .......... *G06F 3/0488* (2013.01); *G06F 3/0481* (2013.01); *G06F 2203/04104* (2013.01)

(58) Field of Classification Search
CPC ........ G06F 9/543; G06F 17/24; G06F 3/0481
USPC .......................................... 715/770, 788, 799
See application file for complete search history.

(56) References Cited

U.S. PATENT DOCUMENTS

| 6,917,348 | B2* | 7/2005 | Demsky et al. | 345/1.1 |
| 7,770,120 | B2* | 8/2010 | Baudisch | 715/740 |
| 8,032,832 | B2* | 10/2011 | Russ et al. | 715/731 |
| 8,095,887 | B2* | 1/2012 | Lee et al. | 715/788 |
| 8,154,473 | B2* | 4/2012 | Engel et al. | 345/4 |
| 8,473,870 | B2* | 6/2013 | Hinckley et al. | 715/863 |
| 8,539,384 | B2* | 9/2013 | Hinckley et al. | 715/863 |
| 8,539,385 | B2* | 9/2013 | Capela et al. | 715/863 |
| 8,539,386 | B2* | 9/2013 | Capela et al. | 715/863 |
| 2004/0174399 | A1* | 9/2004 | Wu | G06F 17/24 715/863 |
| 2006/0117051 | A1* | 6/2006 | Chin | 707/101 |
| 2010/0050076 | A1* | 2/2010 | Roth | G06F 3/04883 715/702 |
| 2011/0113486 | A1* | 5/2011 | Hunt et al. | 726/19 |
| 2012/0110470 | A1* | 5/2012 | Mistry | G06F 3/0488 715/748 |
| 2012/0194487 | A1* | 8/2012 | Roethig et al. | 345/204 |

OTHER PUBLICATIONS

Elaine Marmel, Master Visually Excel 2010, Jul. 2010, Wiley Publishing, 1st edition, pp. 82-83.*

* cited by examiner

*Primary Examiner* — David Phantana Angkool
(74) *Attorney, Agent, or Firm* — Kilpatrick Townsend & Stockton LLP

(57) ABSTRACT

One exemplary embodiment involves a computer-implemented method that comprises rendering, by a processor, an interface comprising one or more containers, each container comprising content. The embodiment involves receiving, via a touch display, a continuous first input, the first input being received for a threshold amount of time at a location corresponding to a first container depicted on the interface. The embodiment then involves copying the first container to create a duplicate container. Additionally, the embodiment involves receiving a second input at a second location on interface and responsive to receipt of the second input, rendering the duplicate container in the interface at the second location.

23 Claims, 8 Drawing Sheets

COMPUTER-IMPLEMENTED METHODS AND SYSTEMS FOR MULTI-TOUCH DUPLICATION AND SWAPPING INTERACTIONS

FIELD

This disclosure relates generally to computer software and more particularly relates to the creation, modification, use, and distribution of electronic content.

BACKGROUND

Conventional techniques for copying and pasting content on a computing device involve providing a series of inputs from one or more input devices to instruct the computing device to perform the copy and paste operation. For example, the inputs may involve a series of inputs for selecting content to be copied, a series of inputs for providing an instruction to copy the selected content, a series of inputs for indicating a location for pasting the content, and a series of inputs providing an instruction to paste the content at the indicated location. The input devices may include a mouse and/or a keyboard from which a user may provide the series of inputs. Additionally, the content may be any one of media, text, documents, files, and/or other types of content.

SUMMARY

Disclosed are embodiments for rendering, by a processor, an interface comprising one or more containers, wherein each container comprises content; and receiving, via a touch display, a continuous first input, the first input being received at a location corresponding to a first container depicted on the interface. Additionally, the embodiments involve receiving a second input at a second location on interface and responsive to receipt of the second input, copying the first container to create a duplicate container. The duplicate container is rendered in the interface at the second location.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Methods and systems are disclosed for copying components on a user interface, such as a container, and swapping content associated with components on the user interface in a minimal number of interactions. For example, the user interface may be a dashboard for presenting content such as images, movies, documents, photographs, and/or other types of media. Additionally, the dashboard user interface may be rendered on a touch screen display associated with a touch computing device. A user may wish to copy a media object, such a photograph, being depicted at one location of the user interface and paste the copied media object at a second location. To this end, the user may select the media object via an input finger and/or another input device for interacting with the touch computing device and hold the selected media object for a threshold amount of time. In response, the selected media object may be copied, including any formatting parameters and/or other attributes associated with the media object. The user may then select a desired location for pasting the copied media object via a second input finger. In one embodiment, the user may continue to hold the selected media object while selecting the location for pasting the copied media object. Upon selecting the location, the copied media object is then rendered at the desired location.

Additionally, the user may wish to swap the locations of two media objects depicted at two different locations of the user interface. To this end, the user may select the two media objects via a first input finger and a second input finger and hold the selected media objects for a threshold amount of time. In one embodiment, the user may hold the selected media objects for a threshold amount of time. The selected media objects may then be swapped and appear at the different locations. Additionally, any formatting parameters and/or other attributes associated with the media objects may also be swapped.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
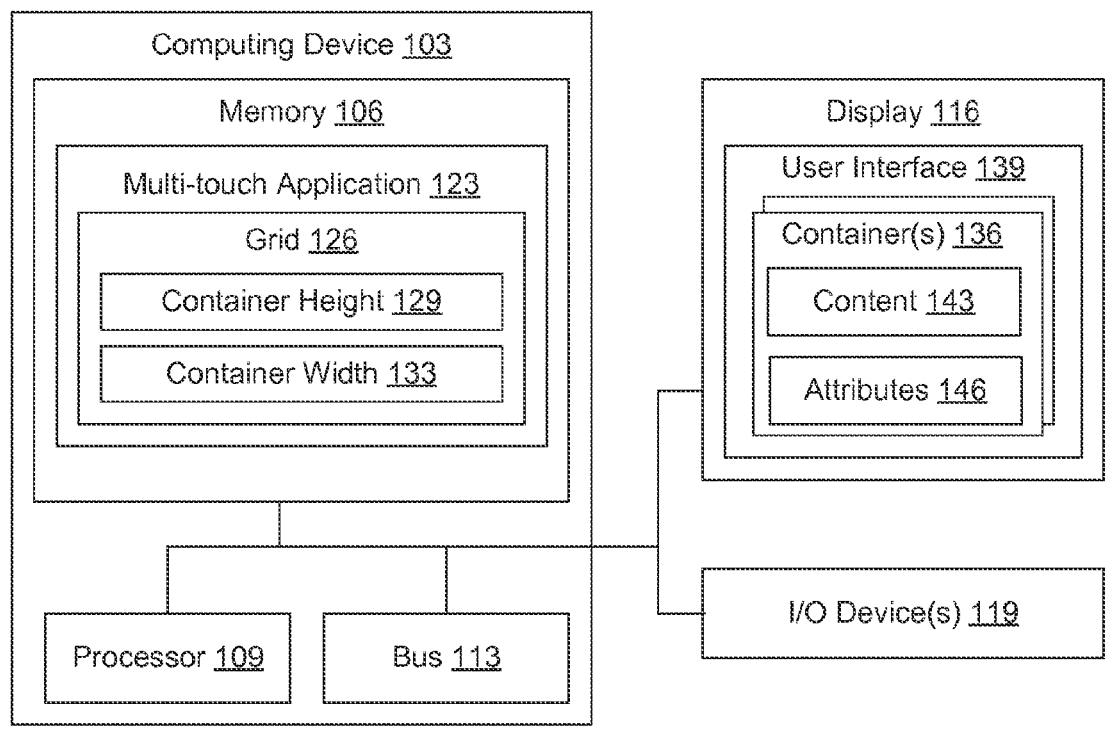
FIG. 1 is a block diagram depicting exemplary computing devices in an exemplary computing environment for implementing certain embodiments.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119. In one embodiment, the input/output device 119 may include a number of external or internal devices such as a mouse, a CD-ROM, DVD, a keyboard, a display, audio speakers, one or more microphones, a stylus, or any other input or output devices. Additionally, the computing device 103 may be a personal computing device, a mobile device, or any other type of electronic devices appropriate for providing one or more of the features described herein. Further, the computing device 103 may be a touch computing device, such as a tablet computer, that includes a touch screen for receiving input. In this example, the input/output device 119 also includes the touch screen for receiving input.

As used here, the term "device" refers to any computing or other electronic equipment that executes instructions and includes any type of processor-based equipment that operates an operating system or otherwise executes instructions. A device will typically include a processor 109, which may comprise one or more processors, that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, tablet computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the computing device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

As used herein, the term "container" refers to a structural component of a user interface rendered on a display of a computing device. A container may include and/or be associated with one or more objects such as media, documents, text, images, audio, and/or other objects that may be presented on a user interface. The container may hold and/or present objects that may be stored locally on the computing device and/or served up from a server accessible via a network. Additionally, a container may also include one or more other containers.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes a multi-touch application 123 that receives input from the touch display screen, associated with the display 116, and performs one or more of the copying and swapping operations discussed herein. Included in the multi-touch application 123 is a grid 126 that includes a container height 129 and a container width 133. In one embodiment, the grid 126 is generated by the multi-touch application 123 in response to a user transmitting a request to perform the copying operation discussed herein. For example, a user may transmit a request to copy a container 136 included on a user interface 139 rendered on the display 116 associated with the computing device 103. The multi-touch application 123 receives the request and in response, copies the selected container 136 and generates a duplicate container 136 to be inserted in the user interface 139. For example, the user may transmit a request to copy a container 136 by selecting and holding a container 136 via an input on the touch screen of the display 116 for a threshold amount of time. In response, the multi-touch application 123 copies the content 143 of the selected container 136 and/or the attributes 146 of the selected container 136. For example, the content 143 may be media, documents, text, images, and/or other objects that may be included within a container 136. The attributes 146 may be associated with the content 143 of the selected container 136 such as formatting of text, properties of media, and/or any other object properties associated with the content 143. In one embodiment, the multi-touch application 123 creates the duplicate container 136 to be an identical copy of the selected container 136.

Next, the multi-touch application 123 inserts the duplicate container 136 on the user interface 139 at a location specified by the user. To this end, the user may select a location by providing a second input via the touch screen of the display 116 while continuing to hold the selected container 136. The multi-touch application 123 inserts the duplicate container 136 at the location on the user interface 139 selected by the user. In one embodiment, the multi-touch application 123 generates the grid 126 to be included in the user interface 139 for the user to select a location for inserting the duplicate container 136. The grid 126 may appear as a mesh, a lattice, a graph and/or other form known in the art where the grid 126 includes a number of cells. In one embodiment, each cell has a height that corresponds to the container height 129 of the selected container 136 and each cell has a width that corresponds to the container width 133 of the selected container 136. Thus, the grid 126 may have a column width that corresponds to the container width 133 and a row height that corresponds to the container height 129. In one embodiment, the user may select any one of the cells of the grid 126 for inserting the duplicate container 136. In another embodiment, the user may select one of the cells of the grid 126 that appears in the same row or column of the originally selected container 136.

The multi-touch application 123 may also swap the contents 143 and/or attributes 146 between two containers 136. For example, the user may transmit a request to swap the content 143 between two containers 136 by simultaneously selecting two containers 136 and holding the selected containers 136 for a threshold amount of time. In one embodiment, the multi-touch application 123 swaps only the contents 143 of selected containers 136, swaps both the contents 143 and the attributes 146 of the selected containers 136, swaps only the attributes 146 of the selected containers 136, and/or swamps a portion of attributes 146 of the selected containers 136, as will be discussed.

Figure 2:
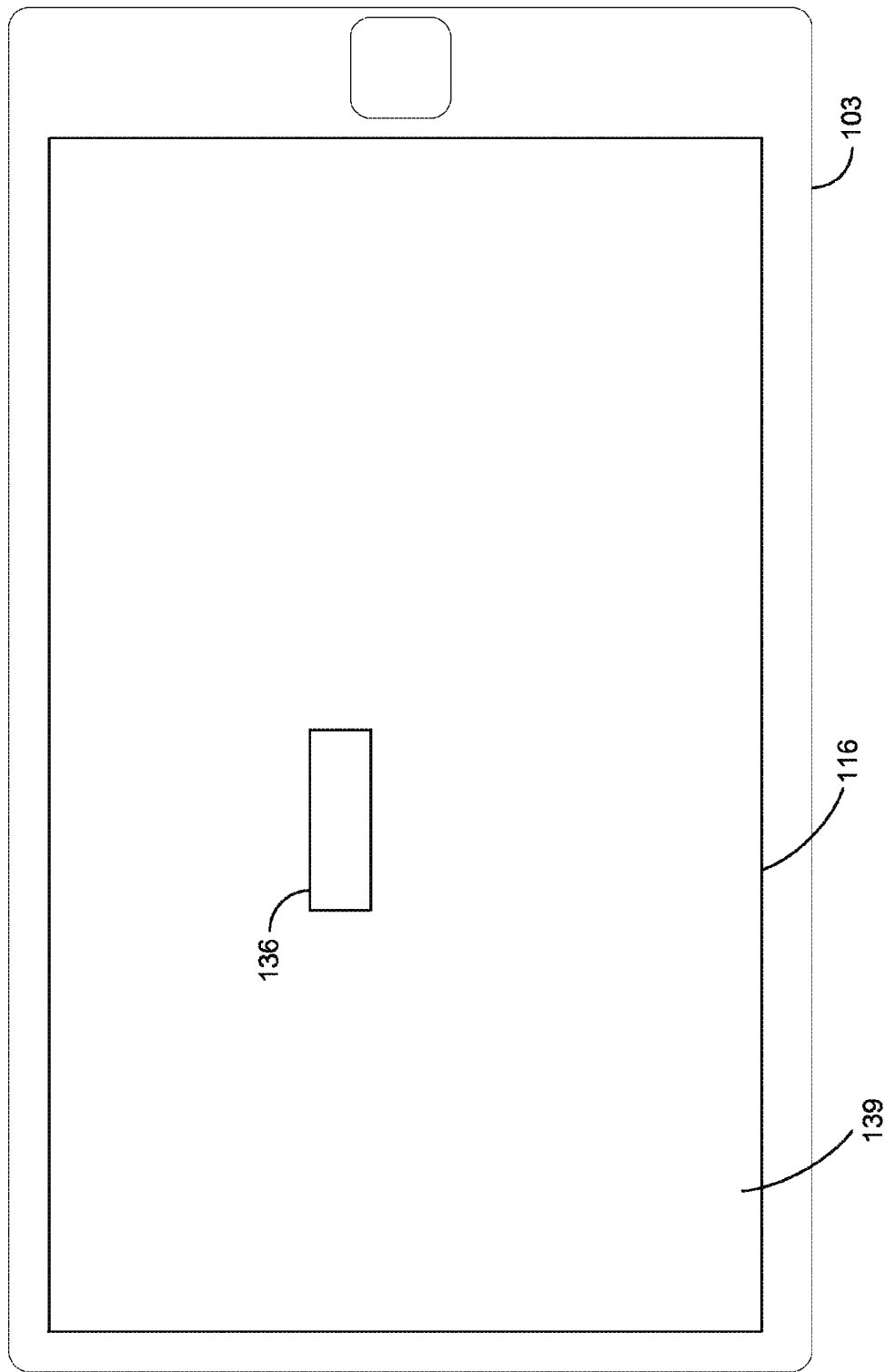
FIG. 2 illustrates an exemplary user interface depicting a container.

FIG. 2 shows one example of a user interface 139 according to certain embodiments of the present disclosure that is rendered on the display 116. In this example, the display 116 is associated with a touch computing device 103 that is configured to receive input via a touch screen. The user interface 139 shown in FIG. 2 includes a container 136. In one embodiment, the container 136 may be a structural element of the user interface that includes objects such as media, documents, text, and/or any other type of object, as discussed above. The container 136 may be any size and shape based at least in part on the shape and size of the objects included in the container 136. In another embodiment, the user interface 139 may include objects without any containers 136, as can be appreciated. In this embodiment, the multi-touch application 123 may directly copy and/or swap the objects, as discussed herein.

Figure 3:
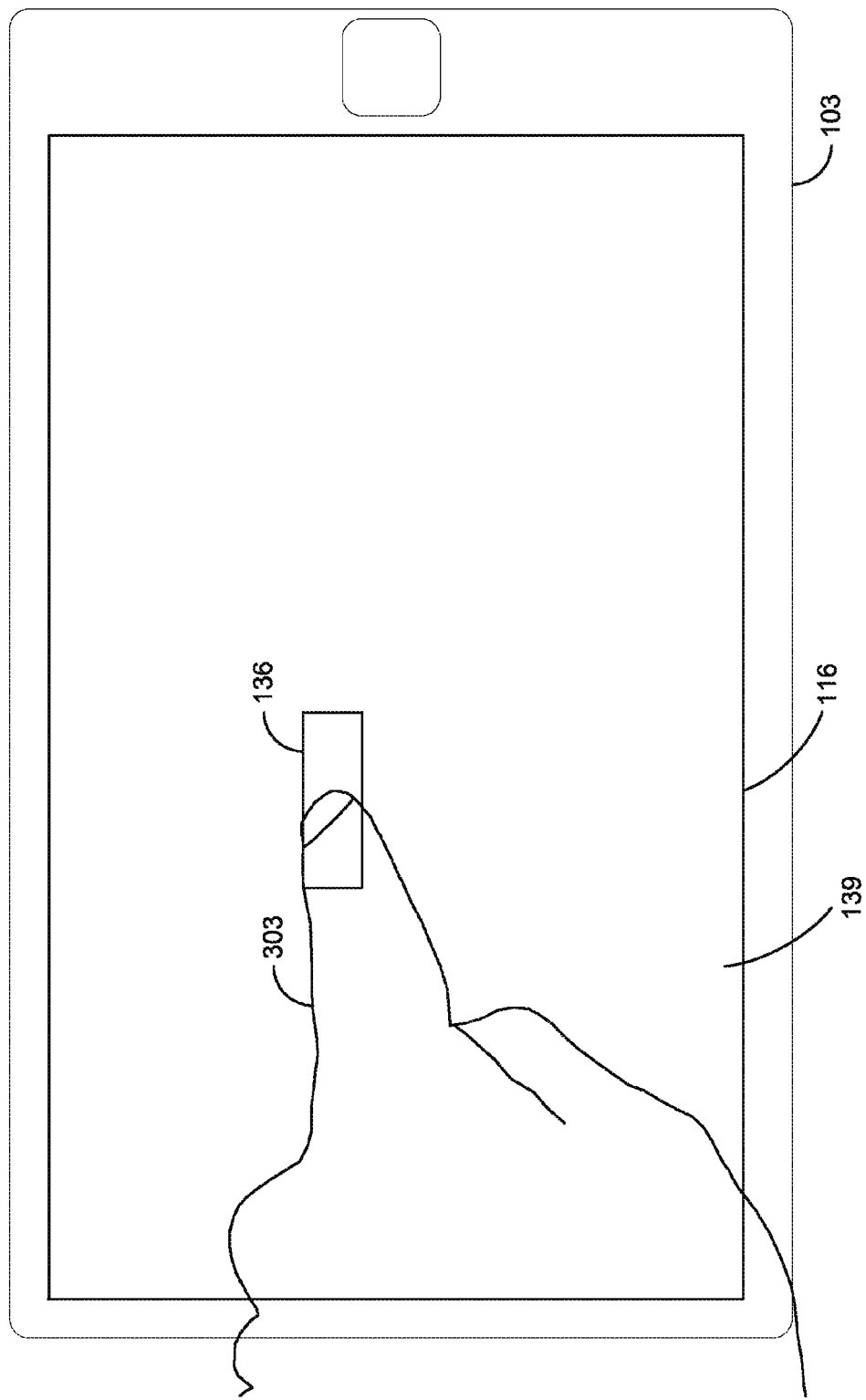
FIG. 3 illustrates an exemplary user interface depicting selection of a container for implementing a copying operation according to certain embodiments.

FIG. 3 shows one example of a user interface 139 according to certain embodiments of the present disclosure that is rendered on the display 116. In this example, a user may wish to copy the container 136 included in the user interface 139. In one embodiment, the user may manipulate the user interface 139 via the touch screen of the display 116 to transmit a request to copy the container 136. For example, the user may select the container 136 and hold the selection for a threshold amount of time to transmit a request to copy the selected container 136. To this end, the user may select the container 136 via a touch input with an input finger 303, a stylus, and/or another device capable of manipulating the user interface 139. In other embodiments, the user may transmit the request to copy the container 136 via a number of other techniques, such as for example, tapping on the desired container 136 multiple times, flicking and/or dragging the container 136 in one or more directions, drawing one or more shapes on the user interface 139 involving the container 136, and/or by providing any other form of input.

The multi-touch application 123 (FIG. 1) receives the input via the touch screen and determines that the user requested to copy the container 136 based on the input. In one embodiment, responsive to the determination to copy, the multi-touch application 123 copies container 136 including one or more of the shape and size of the container 136, the content 143 of the container, and the attributes 146 associated with the content 143. The multi-touch application 123 then renders the duplicate container 136 at a location specified by the user, as will be described with respect to FIG. 4.

Figure 4:
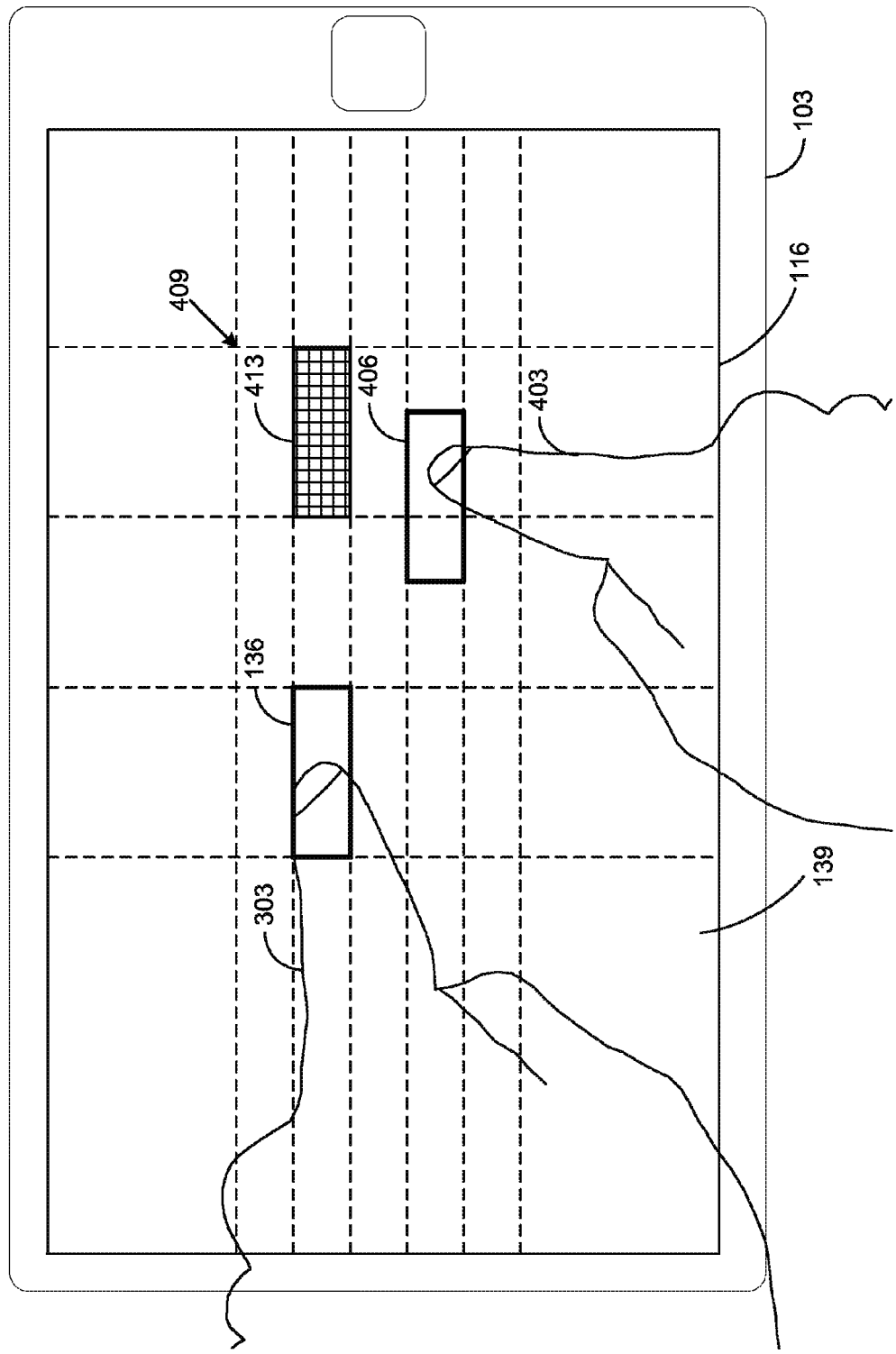
FIG. 4 illustrates an exemplary user interface depicting a duplicate container rendered according to certain embodiments.

FIG. 4 shows one example of a user interface 139 according to certain embodiments of the present disclosure that is rendered on the display 116. In one embodiment, the user interface 139 includes a second input finger 403, a duplicate container 406, a grid 409, a recommended cell 413, and/or other components. As discussed above, the user may have previously transmitted a request to copy the container 136 by selecting and holding the container 136 for a threshold amount of time. The multi-touch application 123 (FIG. 1) copies the selected container 136 and renders the duplicate container 406 at a location specified by the user.

To this end, the user provides a second input via the second input finger 403 to indicate a location for rendering the duplicate container 406. In one embodiment, the second input may be provided while continuously holding the selected container 136 and indicating with the second input finger 403 the location for the duplicate container 406. For example, as shown in FIG. 4, the user is shown as holding the selected container 136 with the first input finger 303 while indicating a location to render the duplicate container 406 with the second input finger 403. In one embodiment, the multi-touch application 123 receives the second input and renders the duplicate container 406 at the location indicated by the second input finger 403. In another embodiment, the multi-touch application 123 may receive the second input in a variety of other manners, such as for example, a user tapping one or more times at the location to render the duplicate container 406, flicking, swiping, dragging via the second input finger 403 at the location to render the duplicate container 406, and/or any other form of input. Additionally, in another embodiment, the multi-touch application 123 may receive the second input from the second input finger 403 sequentially without the original container 136 being continuously held down.

In one embodiment, the multi-touch application 123 renders a grid 409 on the user interface 139 for selecting a location to render the duplicate container 406. The grid 409 may be a tool for the user to identify optimal, aligned, and/or aesthetically advantageous locations for inserting the duplicate container 406. For example, the grid 409 may be a mesh and/or grid with a number of rows and columns. The rows may have a row height that corresponds to the height of the selected container 136, i.e., the container height 129 (FIG. 1), and the columns may have a column width that corresponds to the width of the selected container 136, i.e., the container width 133 (FIG. 1). Additionally, the intersections of the horizontal and vertical lines forming the grid 409 create a number of cells that are configured to correspond to the size of the selected container 136. In one embodiment, the multi-touch application 123 may configure the grid 409 to be any size and/or shape for selecting the location to render the duplicate container 406 based at least in part size and/or shape of the selected container 136.

The user providing the second input may then select one of the cells of the grid 409 for indicating the location to render the duplicate container 406. In one embodiment, the user may provide the second input via the second input finger 403 such as, for example, by tapping one or more times on the desired cell, drawing one or more shapes involving the desired cell, dragging and/or flicking the desired cell, and/or otherwise selecting the desired cell. Upon receiving the second input, the multi-touch application 123 renders the duplicate container 406 at the cell indicated by the user.

In another embodiment, the multi-touch application 123 generates a recommendation for rendering the duplicate container 406. To this end, the multi-touch application 123 renders a recommended cell 413 on the grid 409 that the user may optionally select as the location for rendering the duplicate container 406. For example, the recommended cell 413 may be rendered to be a shaded cell as shown in FIG. 4. In one embodiment, the multi-touch application 123 determines the recommended cell 413 based at least in part on a location and size of the selected container 136. For example, the multi-touch application 123 may recommend that the duplicate container 406 appear on the same row or same column as the selected container 136 for aesthetic purposes and/or any other purpose. The user may then adjust the location of the duplicate container 406 to be located at the recommended cell 413. For instance, the user may move, slide, drag, and/or provide another input to adjust the location of the duplicate container 406.

In another embodiment, the user may provide the second input via the second input finger 403 and in response, the multi-touch application 123 renders the duplicate container 406 at the location specified by the second input. The multi-touch application 123 may additionally render the recommended cell 413 prior to, in conjunction with, and/or after rendering the duplicate container 406 at the specified location. The user may then adjust the location of the duplicate container 406 to be at the recommended cell 413. The multi-touch application 123 generates the recommended cell 413 based at least in part on the location of the selected container 136 and a location of the second input, as will be described with respect to FIG. 5.

The user may also desire to generate multiple copies of the selected container 136. To this end, the user may transmit a request to generate multiple copies by providing multiple inputs indicating the location to render the copies of the selected container 136. For example, the user may provide multiple inputs, each corresponding to one additional copy of the selected container 136, via multiple input fingers. In one embodiment, the user may provide the multiple inputs via multiple fingers. For instance, after providing the first input via the first input finger 303 to select the container 136 and holding the selected container 136 for a threshold amount of time, the user may then simultaneously provide a second input via the second input finger 403 and a third input via a third input finger, while continuing to hold the selected container 136. In response, the multi-touch application 123 may render duplicate containers at locations that correspond to the second input and the third input, as discussed above. Additionally, the multi-touch application 123 may also render recommended cells, as discussed above. The user may then slide, drag, and/or otherwise move the rendered duplicate cells to a desired location on the user interface 139.

Figure 5:
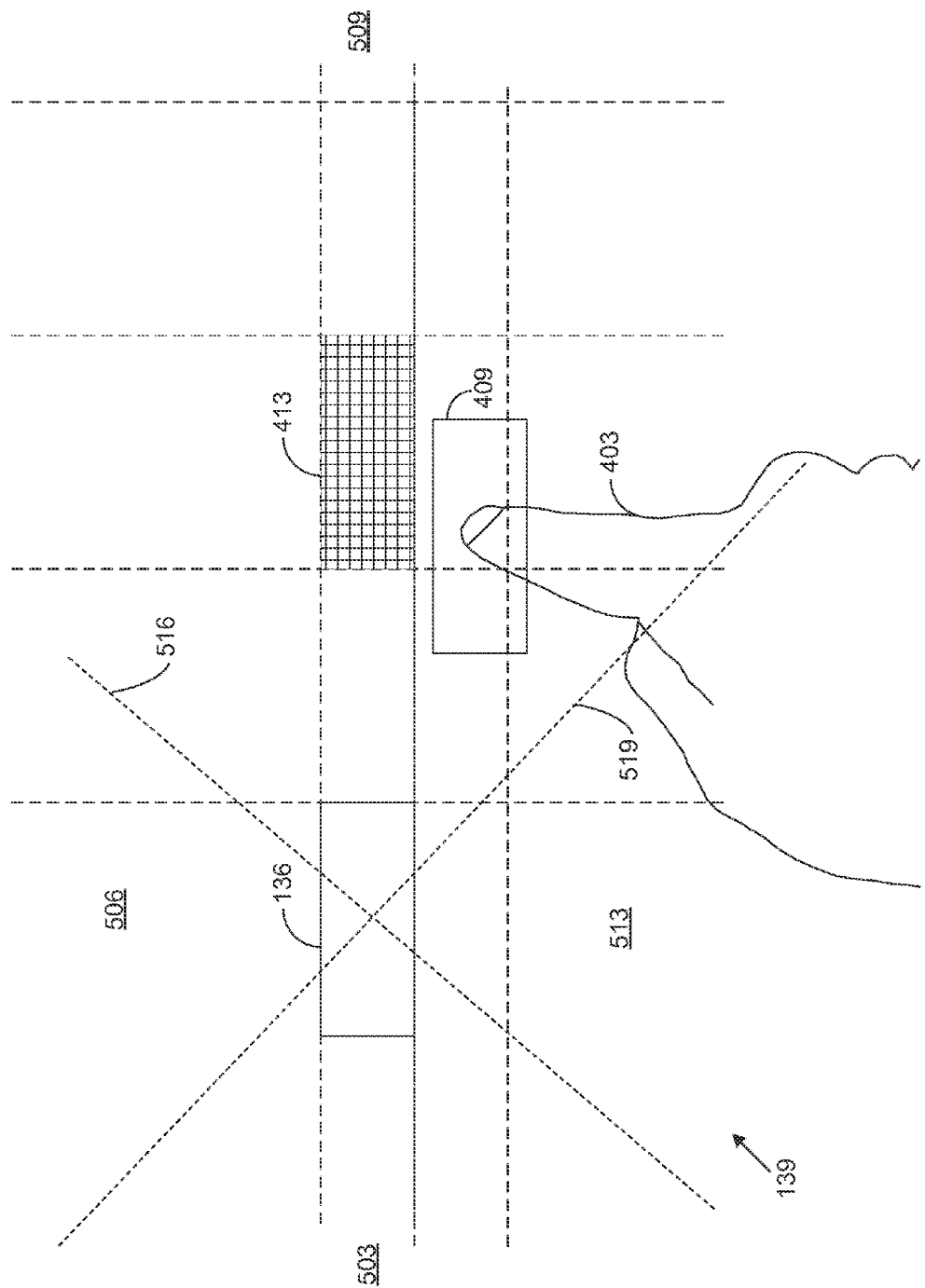
FIG. 5 illustrates an exemplary user interface depicting a grid involved in rendering the duplicate container according to certain embodiments.

FIG. 5 illustrates one exemplary embodiment for generating the recommended cell 413. As discussed above, the user may select and hold the container 136 for a threshold amount of time to transmit a request to copy the selected container 136. In one embodiment, the multi-touch application 123 receives the request and in response, copies the selected container 136 and defines the area surrounding the selected container 136 as having four quadrants 503, 506, 509, and 513. The quadrants 503, 506, 509, and 513 may be defined by at least two lines intersecting the vertices of the selected container 136. For example, intersecting lines 516 and 519 intersect the selected container 136 at the corners thereby dividing the user interface 139 and creating the four quadrants.

The multi-touch application 123 then receives the second input provided by, for example, the second input finger 403, and in response renders the duplicate container 406 at the location specified by the second input finger 403, as discussed above. For example, the location of the second input may be the midpoint of the duplicate container 406 when rendered on the user interface 139. Additionally, the multi-touch application 123 determines which quadrant includes the location indicated by the second input finger 403. In one embodiment, the multi-touch application 123 generates the recommended cell 413 based at least in part on the quadrant where the second input is provided. For example, as shown in FIG. 5, the multi-touch application 123 may determine that the second input is received in quadrant 509. In this example, the multi-touch application 123 then generates the recommended cell 413 to be in the same quadrant 509 where the second input was received. For example, the multi-touch application 123 selects a cell in quadrant 509 to be the recommended cell 413.

Additionally, the multi-touch application 123 may determine which cell within the selected quadrant to generate the recommended cell 413. In one embodiment, the multi-touch application 123 determines the cell based at least in part on the location of the selected container 136. For example, the multi-touch application 123 may determine to render the recommended cell 413 in the same row or column of the grid 409 (FIG. 4) as the selected container 136. Using the example from above, the multi-touch application 123 determines to render the recommended cell 413 in the same row as the selected container 136 in quadrant 509. As shown in FIG. 5, the multi-touch application 123 may determine to render the recommended cell 413 to be in one of a number of cells and still be in the same row as the selected container 136. For instance, the row of the selected container 136 spans many columns.

In one embodiment, the multi-touch application 123 may determine which cell of the row in quadrant 509 to render the recommended cell 413 based at least in part on the location within the quadrant 509 where the second input is received. For example, the location of the second input may correspond to the midpoint of the duplicate container 406, as discussed above. In one embodiment, the multi-touch application 123 determines to render the recommended cell 413 in the cell in the same row as the selected container 136 based on the column that corresponds to the location of the second input. The user may then optionally slide, drag, and/or otherwise move the duplicate container 406 to the recommended cell 413. In another embodiment, the duplicate container 406 may be automatically rendered at the recommended cell 413. For example, the user may provide the second input via the second input finger 403 and the duplicate container 406 may be rendered in the recommended cell 413.

Figure 6:
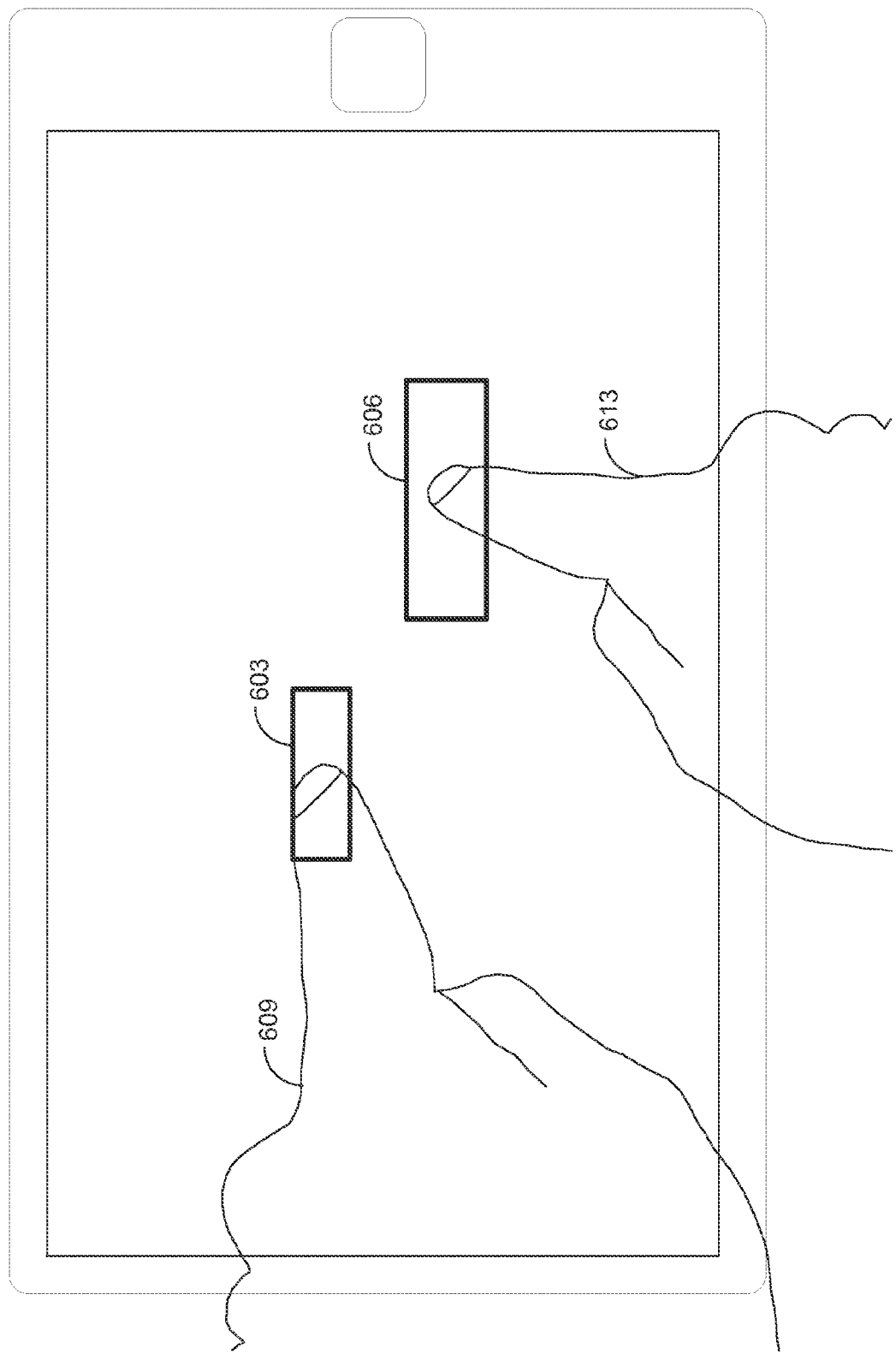
FIG. 6 illustrates an exemplary user interface depicting selection of at least two containers for implementing a swapping operation according to certain embodiments.

FIG. 6 shows one example of a user interface 139 according to certain embodiments of the present disclosure that is rendered on the display 116. FIG. 6 illustrates one embodiment for swapping the content 143 (FIG. 1) of containers 136 (FIG. 1) and/or the attributes 146 (FIG. 1) associated with the content 143 of the containers 136 depicted in the user interface 139. Shown in FIG. 6 are a first container 603, a second container 606, a first input finger 609, and a second input finger 613. In other embodiments, the inputs may be provided by input devices, such as a stylus and/or any other device.

In one embodiment, a user may transmit a request to swap the content 143 of the first container 603 and the second container 606 by selecting and simultaneously holding the first container 603 and the second container 606 for a threshold amount of time. The multi-touch application 123 receives the request and swaps the content 143 of the first container 603 and the second container 606. To this end, the multi-touch application 123 performs a swapping operation as known in the art. For example, the multi-touch application 123 temporarily stores the first content 143 of the first container 603, moves the second content 143 of the second container 606 into the first container 603, and moves the temporarily stored first content 136 originally from the first container 603 to the second container 606. In one embodiment, the multi-touch application 123 may also swap the attributes 146 associated with the content 143 being swapped. For example, the content 143 may be text and the attributes 146 may be formatting associated with the text (i.e., font size, type, style, etc). The multi-touch application 123 may swap the text along with the formatting during the swapping operation. Additionally, the multi-touch application 123 may also swap one or more properties associated with the objects 603 and 606. For example, the multi-touch application 123 may swap the size, orientation, and/or any other properties associated with the objects.

In another embodiment, the multi-touch application 123 may retain the attributes 146 and swap the content 143 while implementing the swap operation. For example, the multi-touch application 123 may retain the first attributes 146 with the first container 603 while swapping out the first content 143 and swapping in the second content 143. Accordingly, the first attributes 146 are applied to the second content 143 in the first container 603 and the second attributes 146 are applied to the first content 143 in the second container 606 upon completion of the swapping operation. Similarly, the multi-touch application 123 may retain the content 143 and swap the attributes 146 while implementing the swap operation. For example, the multi-touch application 123 retains the first content 143 with the first container 603 while swapping out the first attributes 146 and swapping in the second attributes 146. Accordingly, the first content 143 applies the second attributes 146 in the first container 603 and the second content 143 applies the first attributes 146 in the second container 606 upon completion of the swapping operation. In some embodiments, the multi-touch application 123 may render a user interface component on the display 116 for the user to select swapping the content 143 and/or the attributes 146. In other embodiments, the multi-touch application 123 may also render a user interface component on the display 116 for the user to select specific portions of the content 143 and/or specific portions of the attributes 146 to swap.

Additionally, the user may desire to swap the content 143 and/or attributes 146 in multiple containers 136. To this end, the user may transmit a request to swap the content 143 and/or attributes 146 of multiple containers 136 by simultaneously selecting the containers 136 and holding the selected containers for a threshold amount of time. In response, the multi-touch application 123 may swap the content 143 and/or the attributes 146 of the selected containers 136. For example, the multi-touch application 123 may swap the content 143 and/or attributes 146 in a random order, in a clockwise direction, a counter clockwise direction, a left-to-right direction, a right-to-left direction, a top-to-bottom direction, a bottom-to-top direction, and/or any other order. In another embodiment, the user may transmit the request to swap by sequentially selecting the containers 136 and continuously holding the selected containers 136 for a threshold amount of time. In this example, the multi-touch application 123 may swap the content 143 and/or attributes 146 in containers 136 in the order of selection.

Figure 7:
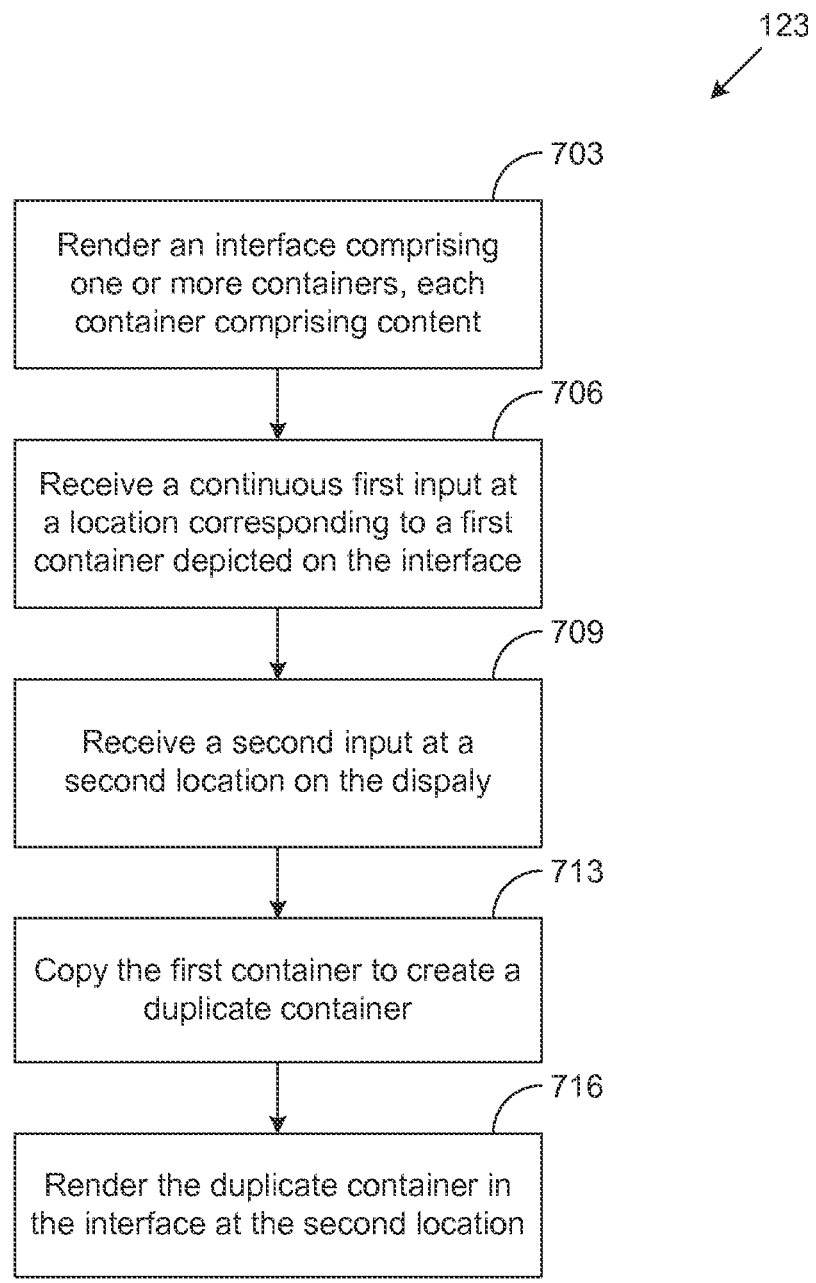
FIG. 7 is a flowchart illustrating an exemplary method for copying a selected container.

FIG. 7 is a flowchart that provides one example of the operation of a portion of the multi-touch application 123 according to certain embodiments. It is understood that the flowchart of FIG. 7 provides merely an example of the many different types of functional arguments that may be employed to implement the operation of the portion of the multi-touch application 123 as described herein. As an alternative, the flowchart of FIG. 7 may be viewed as depicting an example of steps of a method implemented in the computing device 103 (FIG. 1) according to one or more embodiments.

Beginning at step 703, the multi-touch application 123 renders a user interface 139 (FIG. 1) that includes one or more containers 136 (FIG. 1). Each container 136 may include content 143 and a set of attributes 146 (FIG. 1) associated with the content 143. Then, in step 706, the multi-touch application 123 receives a continuous first input at a location corresponding to a first container 136 on the user interface 139. For example, a user may select the first container 136 and continuously hold the selected first container 136 for a threshold amount of time. In step 709, the multi-touch application 123 receives a second input at a second location on user interface 139. For example, the user may provide the second input at the second location while continuously holding the first container 136. In response, the multi-touch application 123, copies the first container 136 to create a duplicate container and renders the duplicate container in the user interface 139 at the second location. In some embodiments, the multi-touch application 123 may copy the first container 136 to create the duplicate container prior to and/or simultaneously with receiving the second input.

Figure 8:
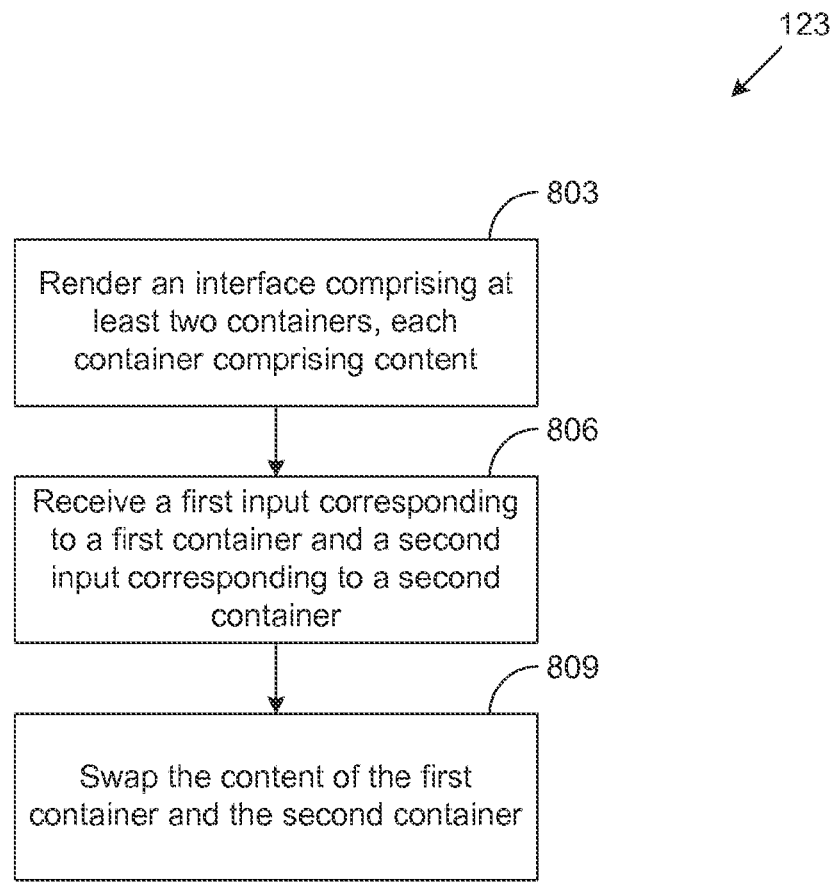
FIG. 8 is a flowchart illustrating an exemplary method for swapping content associated with at least two containers.

FIG. 8 is a flowchart that provides one example of the operation of a portion of the multi-touch application 123 according to certain embodiments. It is understood that the flowchart of FIG. 8 provides merely an example of the many different types of functional arguments that may be employed to implement the operation of the portion of the multi-touch application 123 as described herein. As an alternative, the flowchart of FIG. 8 may be viewed as depicting an example of steps of a method implemented in the computing device 103 (FIG. 1) according to one or more embodiments.

Beginning at step 803, the multi-touch application 123 renders a user interface 139 (FIG. 1) that includes at least two containers 136. Each container 136 includes an amount of content 143 (FIG. 1) such as media, text, documents, files, and/or any other type of content. Then, in step 806, the multi-touch application 123 receives a first input corresponding to a first container 136 and a second input corresponding to a second container 136. In one embodiment, the first input and the second input may be received simultaneously or sequentially. In response, the multi-touch application 123 in step 809 swaps the content 143 of the first container 136 and the second container 136. In other embodiments, the content 143 may also be associated with a set of attributes 146 (FIG. 1). The multi-touch application 123 may additionally swap the attributes 146 in conjunction with the contents 143, as discussed above.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   rendering, by a processor, an interface comprising one or more containers, each container comprising content;
   receiving, via a touch display, a continuous first input, the first input being received for a threshold amount of time at a location corresponding to a first container depicted on the interface;
   copying the first container to create a duplicate container;
   based on determining that the second input is received at the second location on the interface while continuously receiving the first input and responsive to the receipt of the second input, rendering the duplicate container in the interface at the second location.

2. The computer-implemented method of claim 1, wherein rendering the duplicate container comprises:
   determining a grid spanning the touch display, the grid comprising a column width that corresponds to a width of the first container and a row height that corresponds to a height of the first container;
   identifying a cell within the grid based at least in part on the second location; and
   rendering the duplicate container at the identified cell.

3. The computer-implemented method of claim 2, wherein identifying the cell within the grid comprises:
   determining a quadrant where the second input is received;
   identifying a row within the determined quadrant based at least in par on a row
   associated with the first container; and
   identifying the cell to be one of the cells of the identified row.

4. The computer-implemented method of claim 2, wherein identifying the cell within the grid comprises:
   determining a quadrant where the second input is received;
   identifying a column within the determined quadrant based at least in part on a column associated with the first container; and
   identifying the cell to be one of the cells of the identified column.

5. The computer-implemented method of claim 2, wherein identifying the cell within the grid comprises:
   determining a quadrant where the second input is received;
   identifying a column within the determined quadrant based at least in part on a column associated with the first container;
   identifying a row within the determined quadrant based at least in part on a row associated with the first container; and
   identifying the cell to be at the intersection of the identified column arid the identified row.

6. The computer-implemented method of claim 1, wherein the copying the first container comprises:
   identifying content it included in the first container; and
   creating the duplicate container to include the content from the first container.

7. The computer-implemented method of claim 6, wherein the copying the first container comprises:
   identifying a first set of attributes associated with the content of the first container; and
   creating the duplicate container to associate the duplicate content with a duplicate set of attributes identical to the first set of attributes.

8. The computer-implemented method of claim 2, further comprising:
   rendering a recommended cell at the identified cell indicating a recommended location for rendering the duplicate container.

9. The computer-implemented method of claim 8, wherein the location of the recommended cell corresponds to the location of the first container.

10. The computer-implemented method of claim 1, further comprising:
    receiving, via the touch display, an indication of a destination on the user interface to render the duplicate container; and
    rendering the duplicate container in the user interface at the destination.

11. A computer-implemented method comprising:
    rendering, by a processor, an interface comprising at least two containers, each container comprising content;
    receiving, via a touch display, a first touch input corresponding to a first container displayed on the interface and a second touch input corresponding to a second container displayed on the interface; and
    swapping the first content of the first container and the second content of the second container wherein the first content of the first container replaces the second content in the second container and wherein the second content of the second container replaces the first content in the first container.

12. The computer-implemented method of claim 11, wherein the first touch input and the second touch input are received simultaneously.

13. The computer-implemented method of claim 11, wherein the content of each container is associated with one or more attributes.

14. The computer-implemented method of claim 13, further comprising:
    swapping the one or more attributes of the first container and the second container.

15. The computer-implemented method of claim 11, further comprising:
    receiving, via the touch display, one or more additional touch inputs, each additional input corresponding to one additional container, the additional inputs received simultaneously with the first touch input and the second touch input; and swapping the content of the first container, the second container and e additional container corresponding to each additional touch input.

16. The computer-implemented method of claim 11, wherein the first content and second content are swapped in at least one of a random manner, clockwise manner, or a counter clockwise manner.

17. A non-transitory computer-readable medium on which is encoded program code, the program code comprising:

program code for receiving a first input to select an object included in a user interface rendered on a touch screen display, the first input being received at a location that corresponds to the object;

program code for copying the object;

program code for simultaneously receiving a plurality of additional inputs to select a plurality of locations;

program code for rendering the copied object based on determining that the plurality of additional inputs are received at the plurality of locations while continuously-receiving the first input; and program code for responsive to the receipt of the plurality of additional inputs, rendering the copied object at the selected locations.

18. The non-transitory computer-readable medium of claim 17, wherein the first input is continuously received for a threshold amount of time.

19. The non-transitory computer-readable medium of claim 17, further comprising program code for rendering a plurality of recommended locations for rendering the copied object.

20. The non-transitory computer-readable medium of claim 19, wherein the recommended locations are based at least in part on a location of the object.

21. The computer-implemented method of claim 1, wherein rendering the duplicate container comprises:

determining a grid, the grid comprising columns having a column width that corresponds to a width of the first container or rows having a row height that corresponds to a height of the first container;

identifying a cell within the grid based at least in part on the second location; and rendering the duplicate container at the identified cell.

22. The computer-implemented method of claim 1, wherein the container is a rendered user interface component that holds or presents one or more objects stored locally or served up from a server.

23. The computer-implemented method of claim 1, wherein the second input occurs after the first input is initiated, but before it is concluded.

* * * * *

UNITED STATES PATENT AND TRADEMARK OFFICE
CERTIFICATE OF CORRECTION

PATENT NO.        : 9,285,979 B2
APPLICATION NO.   : 13/621641
DATED             : March 15, 2016
INVENTOR(S)       : Remon Tjissen Page 1 of 1

It is certified that error appears in the above-identified patent and that said Letters Patent is hereby corrected as shown below:

Column 11, Claim 3, Line 58

Delete "par"

Insert --part--

Column 13, Claim 15, Line 5

Delete "e"

Insert --the--

Signed and Sealed this
Seventh Day of June, 2016

Michelle K. Lee
*Director of the United States Patent and Trademark Office*